US009368005B2

(12) United States Patent
Cruz-Hernandez et al.

(10) Patent No.: US 9,368,005 B2
(45) Date of Patent: *Jun. 14, 2016

(54) SOUND TO HAPTIC EFFECT CONVERSION SYSTEM USING MAPPING

(71) Applicant: Immersion Corporation, San Jose, CA (US)

(72) Inventors: Juan Manuel Cruz-Hernandez, Montreal (CA); Christopher J Ullrich, Ventura, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/799,059

(22) Filed: Mar. 13, 2013

(65) Prior Publication Data

US 2014/0064516 A1    Mar. 6, 2014

Related U.S. Application Data

(60) Provisional application No. 61/695,614, filed on Aug. 31, 2012.

(51) Int. Cl.
*G10H 1/043* (2006.01)
*G10H 1/16* (2006.01)
*H04R 29/00* (2006.01)
*G08B 6/00* (2006.01)
*G06F 3/01* (2006.01)

(52) U.S. Cl.
CPC . *G08B 6/00* (2013.01); *G06F 3/016* (2013.01)

(58) Field of Classification Search
USPC .................................. 381/118, 58–59, 61–62
See application file for complete search history.

(56) References Cited

U.S. PATENT DOCUMENTS 5,684,722 A    11/1997   Thorner et al.
6,422,941 B1   7/2002    Thorner et al.
7,979,146 B2   7/2011    Ullrich et al.
(Continued)

FOREIGN PATENT DOCUMENTS

EP    0144774 A2    6/1985
EP    2487557 A2    8/2012
(Continued)

OTHER PUBLICATIONS

Christopher J. Ullrich et al., U.S. Appl. No. 13/743,540, filed Jan. 17, 2013.
(Continued)

*Primary Examiner* — Duc Nguyen
*Assistant Examiner* — George Monikang
(74) *Attorney, Agent, or Firm* — Miles & Stockbridge P.C.

(57) ABSTRACT

A haptic conversion system is provided that intercepts audio data, such as a digital audio signal, analyzes the audio data in frequency, and divides the analyzed audio data into one or more audio frequency regions, where each audio frequency region includes one or more audio sub-signals. The haptic conversion system further maps the one or more audio frequency regions to one or more haptic frequency regions, where each haptic frequency region includes one or more haptic signals. The haptic conversion system further maps the one or more haptic effects to one or more actuators. The haptic conversion system further sends the one or more haptic signals to one or more actuators, in order to generate one or more haptic effects.

24 Claims, 5 Drawing Sheets

(56) References Cited

U.S. PATENT DOCUMENTS

| | | |
|---|---|---|
| 8,000,825 B2 | 8/2011 | Ullrich et al. |
| 8,378,964 B2 | 2/2013 | Ullrich et al. |
| 2003/0067440 A1 | 4/2003 | Rank |
| 2003/0068053 A1* | 4/2003 | Chu .............................. 381/118 |
| 2004/0057593 A1* | 3/2004 | Pedersen .............. H04R 25/407 381/321 |
| 2005/0134561 A1 | 6/2005 | Tierling et al. |
| 2007/0242040 A1 | 10/2007 | Ullrich et al. |
| 2010/0066512 A1* | 3/2010 | Rank ........................ G06F 3/016 340/407.2 |
| 2010/0141606 A1* | 6/2010 | Bae .......................... G06F 3/016 345/174 |
| 2011/0115709 A1* | 5/2011 | Cruz-Hernandez ..... G06F 3/016 345/168 |
| 2011/0142254 A1* | 6/2011 | Bal .................. H04L 25/03159 381/94.1 |
| 2011/0202155 A1 | 8/2011 | Ullrich et al. |
| 2011/0215913 A1 | 9/2011 | Ullrich et al. |
| 2012/0206246 A1 | 8/2012 | Cruz-Hernandez et al. |
| 2012/0206247 A1 | 8/2012 | Bhatia et al. |
| 2012/0306631 A1 | 12/2012 | Hughes |

FOREIGN PATENT DOCUMENTS

| | | |
|---|---|---|
| WO | 03032289 A1 | 4/2003 |
| WO | 2010054014 A1 | 5/2010 |

OTHER PUBLICATIONS

Henry Da Costa et al., U.S. Appl. No. 13/439,241, filed Apr. 4, 2012.

Satvir Singh Bhatia, U.S. Appl. No. 13/661,140, filed Oct. 26, 2012.

Juan Manuel Cruz-Hernandez et al., U.S. Appl. No. 13/767,129, filed Feb. 14, 2013.

Christopher J. Ullrich et al., U.S. Appl. No. 13/785,166, filed Mar. 5, 2013.

Christopher J. Ullrich et al., U.S. Appl. No. 13/788,487, filed Mar. 7, 2013.

Juan Manuel Cruz-Hernandez, U.S. Appl. No. 13/803,778, filed Mar. 14, 2013.

Amaya Becvar Weddle et al., U.S. Appl. No. 14/019,606, filed Sep. 6, 2013.

Jamal Saboune et al., U.S. Appl. No. 14/020,461, filed Sep. 6, 2013.

Jamal Saboune et al., U.S. Appl. No. 14/020,502, filed Sep. 6, 2013.

* cited by examiner

SOUND TO HAPTIC EFFECT CONVERSION SYSTEM USING MAPPING

CROSS-REFERENCE TO RELATED APPLICATIONS

This application claims priority of U.S. Provisional Patent Application Ser. No. 61/695,614, filed on Aug. 31, 2012, the disclosure of which is hereby incorporated by reference.

FIELD

One embodiment is directed generally to a device, and more particularly, to a device that produces haptic effects.

BACKGROUND

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

Such devices can also be configured to play audio data, such as a digital audio signal. For example, such devices can include applications configured to play video data, such as a movie or video game, that contains an audio portion, or audio data, such as a song. Similar to haptics, calls to additional embedded hardware capable of generating audio effects (such as speakers) can be programmed within the OS of the device. Thus, the OS of the device can send a play command through control circuitry to the additional embedded hardware, where the additional embedded hardware then produces the appropriate audio effect.

SUMMARY

One embodiment is a system that converts an audio signal into one or more haptic effects. The system analyzes the audio signal. The system further divides the audio signal into one or more audio frequency regions, where each audio frequency region includes one or more audio sub-signals. The system further maps the one or more audio frequency regions to one or more haptic frequency regions, where each audio frequency region is mapped to one or more corresponding haptic frequency regions, and where each haptic frequency region includes one or more haptic signals. The system further sends the one or more haptic signals to an actuator to generate the one or more haptic effects.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment is a haptic conversion system that can receive audio data, such as a digital audio signal, analyze the audio data in frequency, and divide the analyzed audio data into one or more audio frequency regions, where each audio frequency region includes one or more audio sub-signals. The haptic conversion system can further map the one or more audio frequency regions to one or more haptic frequency regions, where each haptic frequency region includes one or more haptic signals. The haptic conversion system can further map the one or more haptic signals to one or more actuators. The haptic conversion system can further send the one or more haptic signals to one or more actuators, in order to generate one or more haptic effects.

Figure 1:
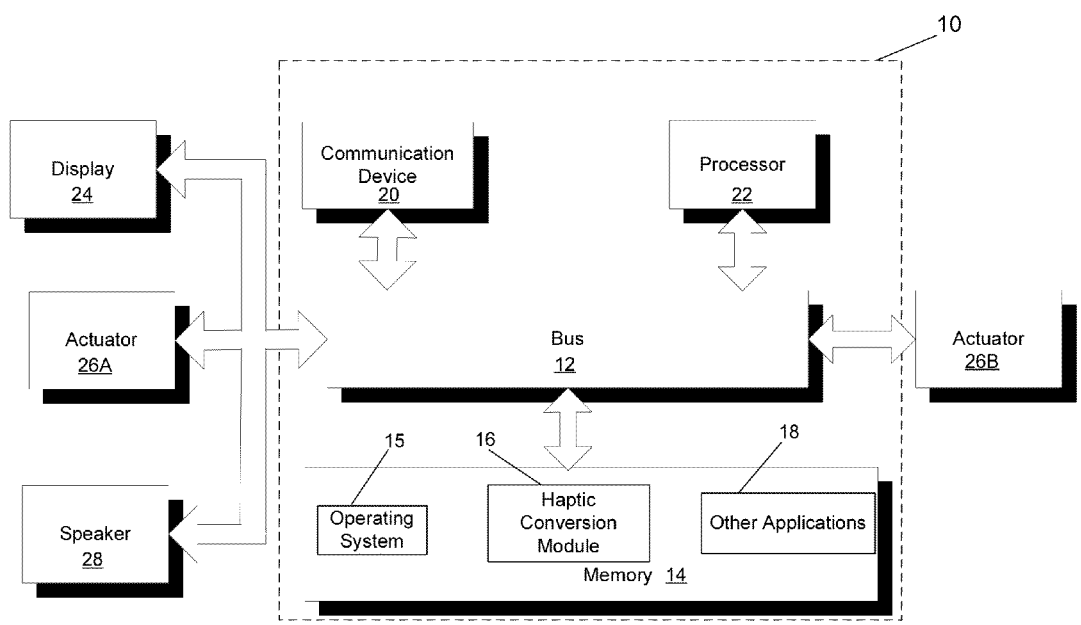
FIG. 1 illustrates a block diagram of a haptic conversion system in accordance with one embodiment of the invention.

FIG. 1 illustrates a block diagram of a haptic conversion system 10 in accordance with one embodiment of the invention. In one embodiment, system 10 is part of a mobile device, and system 10 provides a haptic conversion functionality for the mobile device. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include a haptic conversion module 16 that converts an audio signal into one or more haptic signals that are used to produce one or more haptic effects, as disclosed in more detail below. In certain embodiments, haptic conversion module 16 can comprise a plurality of modules, where each module provides specific individual functionality for converting an audio signal into one or more haptic signals that are used to produce one or more haptic effects. System 10 will typically include one or more additional application modules 18 to include additional functionality, such as Integrator™ software by Immersion Corporation.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touch screen, configured to send and receive signals from processor 22, and may be a multi-touch touch screen.

System 10 further includes a plurality of actuators 26 (e.g., actuators 26A and 26B). One of ordinary skill in the art would readily appreciate that in the illustrated embodiment of FIG. 1, the plurality of actuators 26 includes two actuators (i.e., actuators 26A and 26B), but that in alternate embodiments, the plurality of actuators 26 can include any number of actuators. Processor 22 may transmit a haptic signal associated with a haptic effect to one or more actuators of the plurality of actuators 26, where each actuator of the one or more actuators, in turn, outputs haptic effects. Each actuator of the plurality of actuators 26 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. Furthermore, each actuator of the plurality of actuators 26 may be of a different actuator type.

In some embodiments, system 10 further includes one or more speakers 28. Processor 22 may transmit an audio signal to speaker 28, which in turn outputs audio effects. Speaker 28 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker.

Figure 2:
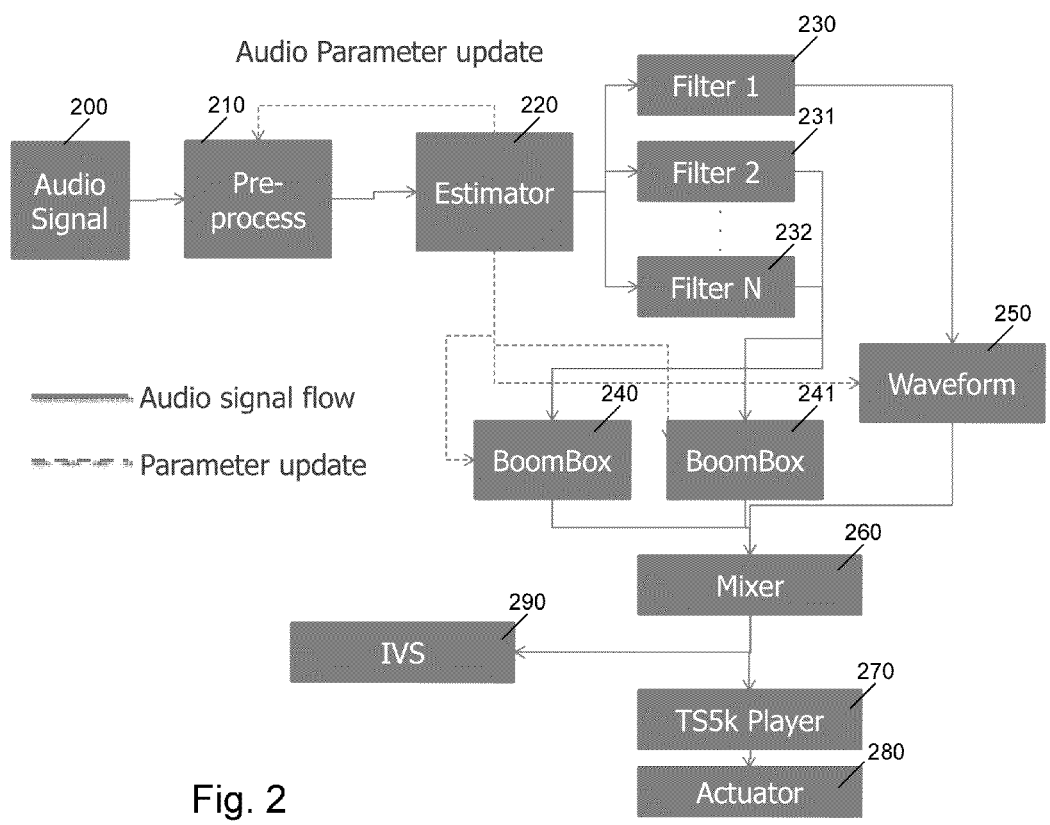
FIG. 2 illustrates a block diagram of a haptic conversion system that converts an audio signal into one or more haptic signals that are sent to an actuator in order to generate one or more haptic effects, according to an embodiment of the invention.

FIG. 2 illustrates a block diagram of a haptic conversion system that converts an audio signal into one or more haptic signals that are sent to an actuator in order to generate one or more haptic effects, according to an embodiment of the invention. According to an embodiment, a mechanism is provided for adjusting one or more parameters of an audio-to-haptic conversion process based on various measures of an input audio signal and/or external data. From a user perspective, the result is a haptic experience that is more selective in its response, enabling vibrotactile feedback for foreground events (such as collisions, explosions, etc. in games), and reducing or muting feedback for background events (such as in-game music or ambient noise). By distinguishing between perceptually important qualities of an audio signal, the audio-to-haptic conversion process can prevent a "background rumble" that can occur in games that have both sound effects and a music track, or media files that have significant transitions but also have ambient noise.

The illustrated embodiment of FIG. 2 illustrates the parameters of the haptic conversion system being updated using the dashed lines. In one embodiment, the haptic conversion system includes a real time modification of parameters of the audio-to-haptic conversion process to stress certain characteristics of the audio file through haptics, where this is accomplished by modifying, in real time or during offline conversion, the parameters of waveform and boombox modules of the haptic conversion system, as is further described in greater detail. In addition, a pre-process module may modify the audio signal itself using audio processing algorithms in order to enhance or modify the overall audio-to-haptic conversion process. In an alternate embodiment, an audio signal can be pre-processed to extract the appropriate information and then stored back in the audio signal to be interpreted, in real time, by the audio-to-haptic conversion process.

According to the embodiment, the haptic conversion system receives audio signal 200. In certain embodiments, audio signal 200 includes one or more digital audio buffers, such as pulse-code modulation ("PCM") audio buffers, where each PCM audio buffer comprises one or more PCM audio data frames. In other embodiments, audio signal 200 includes one or more structure-based audio buffers, such as Musical Instrument Digital Interface ("MIDI") audio buffers, where each MIDI audio buffer comprises one or more MIDI audio data frames. In yet other embodiments, audio signal 200 includes one or more frequency domain audio buffers, such as MPEG-2 Audio Layer III ("MP3") audio buffers, where each MP3 audio buffer comprises one or more MP3 audio data frames. In yet other embodiments, audio signal 200 includes one or more audio buffers that are of other audio formats known to one of ordinary skill in the art. In yet other embodiments, audio signal 200 also contains haptic information that can include parameters or other cues used to configure the conversion algorithm.

The haptic conversion system subsequently sends audio signal 200 to a pre-process module 210, which performs any pre-processing necessary on audio signal 200. Such pre-processing can include under-sampling audio signal 200. An example scenario where audio signal 200 is under-sampled is where audio signal 200 has a sampling frequency greater than 8 kilohertz ("kHz"). Such pre-processing could alternatively include fusing an average of two or more channels of audio signal 200, where audio signal 200 is a stereo audio signal. Thus, the goal of pre-process module 210 is to ensure that an estimator module receives a consistent signal, regardless of the format of audio signal 200. The pre-processing can be based on one or more parameters. The haptic conversion system subsequently sends audio signal 200 to an estimator module 220, which analyzes audio signal 200 to determine one or more audio frequency regions of audio signal 200. In certain embodiments, estimator module 220 can determine a number of filters to use to determine one or more audio frequency regions of audio signal 200. Estimator module 220 can further adjust one or more parameters of pre-process module 210, and can further adjust one or more parameters of a boombox module (represented in FIG. 2 as boombox modules 240 and 241) and/or one or more parameters of a waveform module (represented in FIG. 2 as waveform module 250). The haptic conversion system subsequently sends audio signal 200 to one or more filters (represented in FIG. 2 as filters 230, 231, and 232), where audio signal 200 is divided into the one or more determined audio frequency regions. Further, as part of the sending of audio signal 200 to one or more filters, each audio frequency region of audio signal 200 is produced by a separate filter. The determination of the one or more audio frequency regions can be based on one or more parameters. Such division is described in greater detail with respect to FIG. 3.

The haptic conversion system further sends certain audio frequency regions of audio signal 200 to a boombox module (represented in FIG. 2 as boombox modules 240 and 241), where the boombox module calculates a maximum value of each audio frequency region of the audio signal. The boombox module further generates a haptic frequency region that includes one or more haptic signals based on the calculated maximum value, and maps the audio frequency region of audio signal 200 to the generated haptic frequency region. The generation of the haptic frequency region can be based on one or more parameters. Such mapping is further described in greater detail with respect to FIG. 3. The haptic conversion system further sends other audio frequency regions of audio signal 200 to a waveform module (represented in FIG. 2 as waveform module 250), where the waveform module calculates a maximum value of each audio frequency region of audio signal 200, and further calculates a sine carrier waveform based on the maximum value of the audio frequency region of audio signal 200. The waveform module further generates a haptic frequency region that includes one or more haptic signals based on the calculated maximum value and the calculated sine carrier waveform, and maps the audio frequency region of the audio signal 200 to the generated haptic frequency region. The generation of the haptic frequency region can be based on one or more parameters. Such mapping is also further described in greater detail with respect to FIG. 3.

The one or more haptic signals of the one or more haptic frequency regions are sent to a mixer module 260, where mixer module 260 combines the one or more haptic signals into a single combined haptic signal that may include additional filtering steps in order to prevent signal saturation. In an alternate embodiment, mixer module 260 also maps the N input signals onto M output actuators taking into account the frequency response, amplitude and physical location of each output actuator. The combined haptic signal is subsequently sent to a haptic effect player module 270, such as a Touch-Sense® 5000 Player module by Immersion Corporation, where haptic effect player module 270 is configured to play one or more haptic effects at an actuator 280 by sending the combined haptic signal to actuator 280. Optionally, the combined haptic signal is also stored within a haptic effect file 290, such as an Immersion Vibration Source ("IVS") haptic effect file or an embedded track in a standard container format file, such as MPEG-4.

Figure 3:
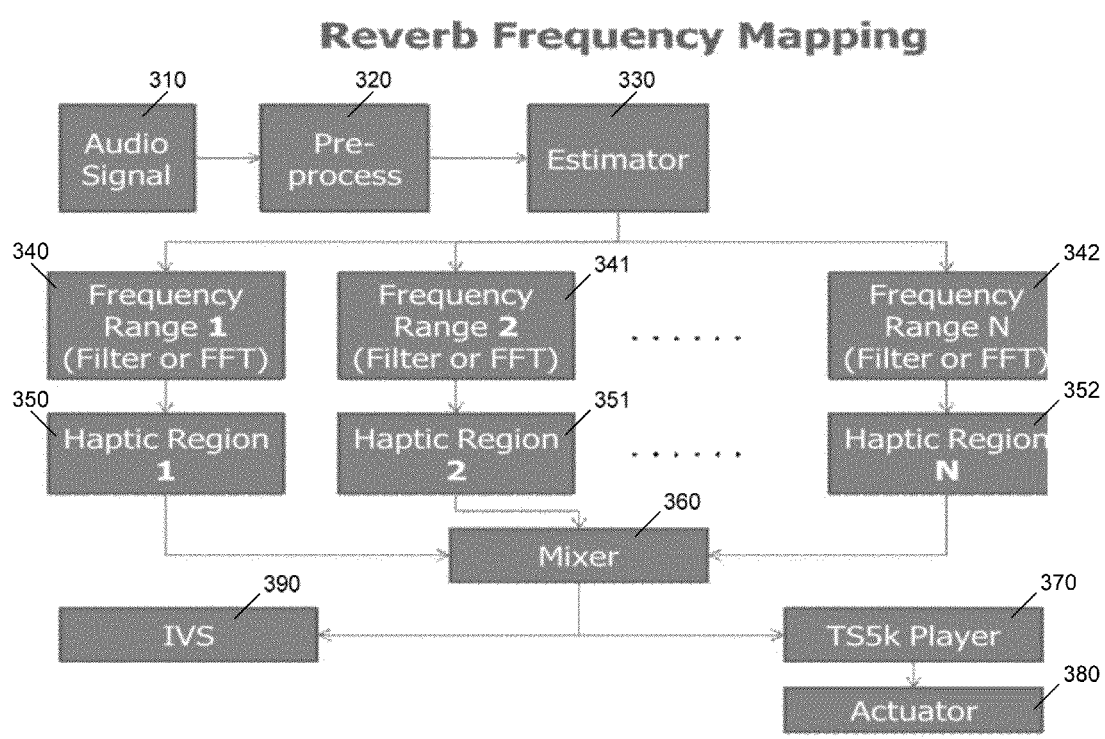
FIG. 3 illustrates a block diagram of a haptic conversion system that divides an audio signal into one or more audio frequency regions, and maps each audio frequency region to a haptic frequency region, according to an embodiment of the invention.

FIG. 3 illustrates a block diagram of a haptic conversion system that divides an audio signal into one or more audio frequency regions, and maps each audio frequency region to a haptic frequency region, according to an embodiment of the invention. According to the embodiment, an audio-to-haptic conversion process can include frequency mapping from an audio frequency region to a haptic frequency region. The audio content can be analyzed in frequency, and then divided into one or more audio frequency regions, where each audio frequency region includes one or more audio sub-signals of the audio content. Further, each audio frequency region can be mapped to one or more haptic frequency regions, where each haptic frequency region includes one or more haptic signals. Selection of frequencies for the haptic frequency regions can be determined based on actuator characteristics (for example, does the actuator have enough dynamic range at a specified frequency), by characteristics of haptic effects that can be perceived by a human, so that the haptic frequency content is easily distinguishable, or by the frequency content of the audio signal itself. For example, the power content in each audio frequency region can be extracted and used to magnitude modulate the haptic content in each haptic frequency region.

According to the embodiment, the haptic conversion system receives audio signal 310. In certain embodiments, audio signal 310 is similar to audio signal 200 of FIG. 2. The haptic conversion system subsequently sends audio signal 310 to a pre-process module 320, which performs any pre-processing necessary on audio signal 310. Examples of pre-processing are previously described with respect to FIG. 2. The haptic conversion system subsequently sends audio signal 310 to an estimator module 330, which analyzes audio signal 310 to determine one or more audio frequency regions of audio signal 310. Estimator module 330 subsequently divides audio signal 310 into the one or more determined audio frequency regions (represented in FIG. 3 as audio frequency regions 340, 341 and 342). Further, as part of the dividing audio signal 310 into the one or more determined audio frequency regions, each audio frequency region of audio signal 310 is produced by a separate filter. Estimator module 330 can modify or update this mapping in response to modifications in the processed audio signal. In certain embodiments, each audio frequency region represents a range of frequencies for sub-signals contained within audio signal 310. For example, in an embodiment where audio signal 310 is divided into three audio frequency regions, a first audio frequency region can include sub-signals with a frequency within a low range, a second audio frequency region can include sub-signals with a frequency within a middle range, and a third audio frequency region can include sub-signals with a frequency within a high range. This is merely an example number of audio frequency regions, and an audio signal can be divided into any number of audio frequency regions.

Subsequently, the one or more audio frequency regions are mapped to one or more haptic frequency regions (represented in FIG. 3 as haptic frequency regions 350, 351, and 352). In certain embodiments, each haptic frequency region represents a range of frequencies for one or more haptic signals that are generated based on audio signal 310. For example, in an embodiment that includes three haptic frequency regions, a first haptic frequency region can include haptic signals with a frequency within a low range, a second haptic frequency region can include haptic signals with a frequency within a middle range, and a third haptic frequency region can include haptic signals with a frequency within a high range. This is merely an example number of haptic frequency regions, and there can be any number of haptic frequency regions. In certain embodiments, filter 230 of FIG. 2 corresponds to audio frequency range 340 and haptic frequency range 350 of FIG. 3, filter 231 of FIG. 2 corresponds to audio frequency range 341 and haptic frequency range 351 of FIG. 3, and filter 232 of FIG. 2 corresponds to audio frequency range 342 and frequency range 352 of FIG. 3.

In certain embodiments, audio frequency regions that include sub-signals with a frequency in a lower range can be mapped to haptic frequency regions that include haptic signals with a frequency in a lower range. Likewise, in these embodiments, audio frequency regions that include sub-signals with a frequency in a higher range can be mapped to haptic frequency regions that include haptic signals with a frequency in a higher range. In an example embodiment, the haptic conversion system can divide audio signal 300 into a plurality of audio frequency regions, and map each audio frequency region to a corresponding haptic frequency region, as follows:

| Audio Frequency Region | Haptic Frequency Region |
|---|---|
| <200 Hz | 100 Hz |
| Between 200 Hz and 4000 Hz | 175 Hz |
| >4000 Hz | 250 Hz |

The one or more haptic signals of the one or more haptic frequency regions are sent to a mixer module 360, where mixer module 360 combines the one or more haptic signals into a single combined haptic signal. The combined haptic signal is subsequently sent to a haptic effect player module 370, such as a TouchSense® 5000 Player module by Immersion Corporation, where haptic effect player module 370 is configured to play one or more haptic effects at an actuator 380 by sending the combined haptic signal to actuator 380. Optionally, the combined haptic signal is also stored within a haptic effect file 390, such as an IVS haptic effect file.

Figure 4:
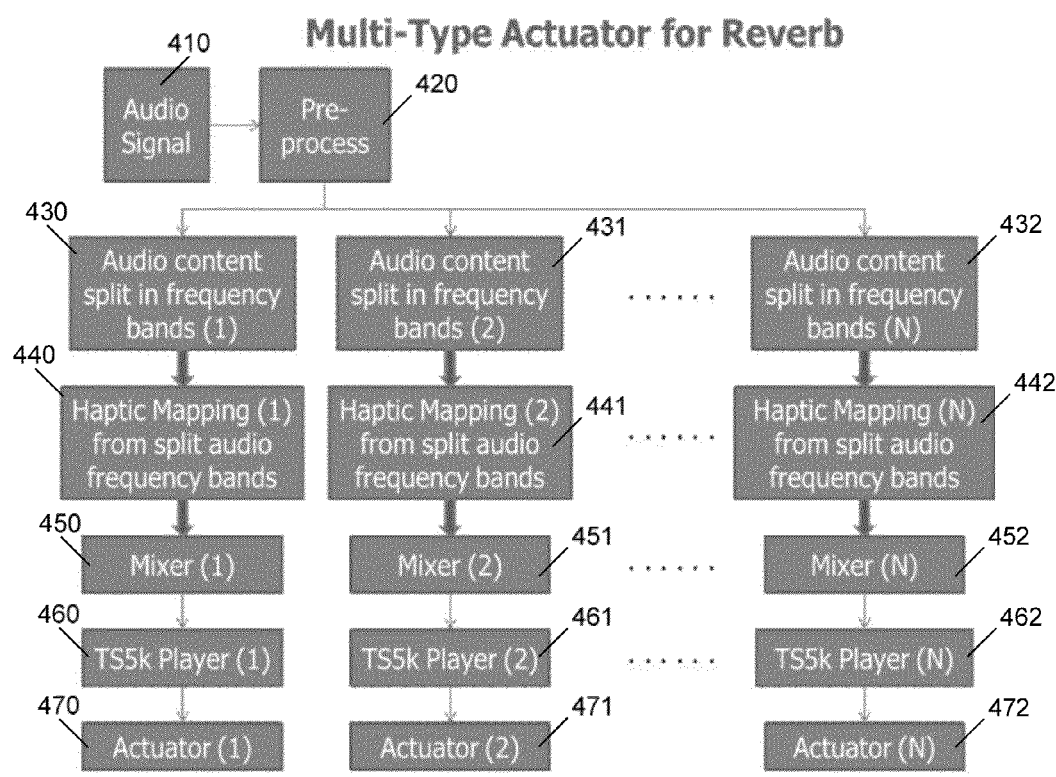
FIG. 4 illustrates a block diagram of a haptic conversion system that maps one or more haptic frequency regions to an actuator of a plurality of actuators, according to an embodiment of the invention.

FIG. 4 illustrates a block diagram of a haptic conversion system that maps one or more haptic frequency regions to an actuator of a plurality of actuators, according to an embodiment of the invention. It is generally known that humans can have difficulty discriminating frequencies, especially when those frequencies are close within a certain range. It is also generally known that some users prefer low frequency haptic effects generated by certain actuators, whereas other users prefer high frequency haptic effects generated by wide frequency band actuators. According to the embodiment, a combination of low-frequency response actuators (such as ERMs) can be combined with wide bandwidth actuators (such as piezoelectric actuators) to create a richer haptic content for applications, where the haptic content cannot be created by a single actuator because of the dynamic and frequency characteristics of the actuator's design, as described in the following table:

|  | ERM | Piezoelectric Actuator |
|---|---|---|
| Frequency Range (Hz) | 60-120 | 120-300 |
| Magnitude | Coupled to frequency; low at low frequencies, high at high frequencies | Resonant at ~200 HZ; independent of frequency |

Since the ERM can create low frequency vibrations (between 60 and 200 Hz) but with fixed magnitude at each frequency, no superposition effects can be created to output signals with low and high frequency content. The piezoelectric actuator, on the other hand, does not have the dynamic range below 100 Hz to output meaningful haptic effects in this range. A combination of the two actuators can provide a haptic effect designer with a richer palette to choose from, enhancing the user experience.

Further, different algorithms can be created to combine the two actuators. For example, in one instance, the piezoelectric actuator can be used to display background music in a game, while the ERM can be used to display interaction effects (such as explosions, collisions, etc.). The combination of the two actuators can also be used to create richer textures by combining the low and high frequency content.

According to the embodiment, the haptic conversion system receives audio signal 410. In certain embodiments, audio signal 410 is similar to audio signal 200 of FIG. 2 and audio signal 310 of FIG. 3. The haptic conversion system subsequently sends audio signal 410 to a pre-process module 420, which performs any pre-processing necessary on audio signal 400. Examples of pre-processing are previously described with respect to FIG. 2. Pre-process module 420 also divides audio signal 410 into a plurality of audio regions (which are different from an audio frequency region, as the audio signal is divided into regions based on corresponding actuators, rather than a frequency of sub-signals of the audio signal), where each audio region corresponds to an actuator of a plurality of actuators (represented in FIG. 4 by actuators 470, 471, and 472. In the illustrated embodiment, pre-process module 420 divides audio signal 410 into three audio regions. However, this is merely an example embodiment, and pre-process module 420 can divide audio signal 410 into any number of audio regions. In certain embodiments, the plurality of actuators includes at least one low frequency actuator and one high frequency actuator.

According to the embodiment, each audio region is divided into one or more audio frequency regions, where each audio frequency region represents a range of frequencies for sub-signals contained within the corresponding audio region. In the illustrated embodiment, the first audio region is divided into audio frequency regions 430, the second audio region is divided into audio frequency regions 431, and the third audio region is divided into audio frequency regions 432. Subsequently, for each audio region, the one or more audio frequency regions are mapped to one or more haptic frequency regions, where each haptic frequency region represents a range of frequencies for one or more haptic signals that are generated based on the audio region. In the illustrated embodiment, audio frequency regions 430 are mapped to haptic frequency regions 440, audio frequency regions 431 are mapped to haptic frequency regions 441, and audio frequency regions 432 are mapped to haptic frequency regions 442.

Subsequently, for each audio region, the one or more haptic signals of the one or more haptic frequency regions are sent to a mixer module, where the mixer module combines the one or more haptic signals into a single combined haptic signal. In the illustrated embodiment, the one or more haptic signals of haptic frequency regions 440 are sent to mixer module 450, where mixer module 450 combines the one or more haptic signals into a first combined haptic signal. The one or more haptic signals of haptic frequency regions 441 are sent to mixer module 451, where mixer module 451 combines the one or more haptic signals into a second combined haptic signal. The one or more haptic signals of haptic frequency regions 442 are sent to mixer module 452, where mixer module 452 combines the one or more haptic signals into a third combined haptic signal.

Each combined haptic signal is subsequently sent to a haptic effect player module, such as a TouchSense® 5000 Player module by Immersion Corporation, where each haptic effect player module is configured to play one or more haptic effects at a corresponding actuator by sending the respective combined signal to the respective actuator. In the illustrated embodiment, mixer module 450 sends the first combined haptic signal to haptic effect player module 460, where haptic effect player module 460 is configured to play one or more haptic effects at actuator 470 by sending the first combined haptic signal to actuator 470. Mixer module 451 sends the second combined haptic signal to haptic effect player module 461, where haptic effect player module 461 is configured to play one or more haptic effects at actuator 471 by sending the second combined haptic signal to actuator 471. Mixer module 452 sends the third combined haptic signal to haptic effect player module 462, where haptic effect player module 462 is configured to play one or more haptic effects at actuator 472 by sending the third combined haptic signal to actuator 472.

Figure 5:
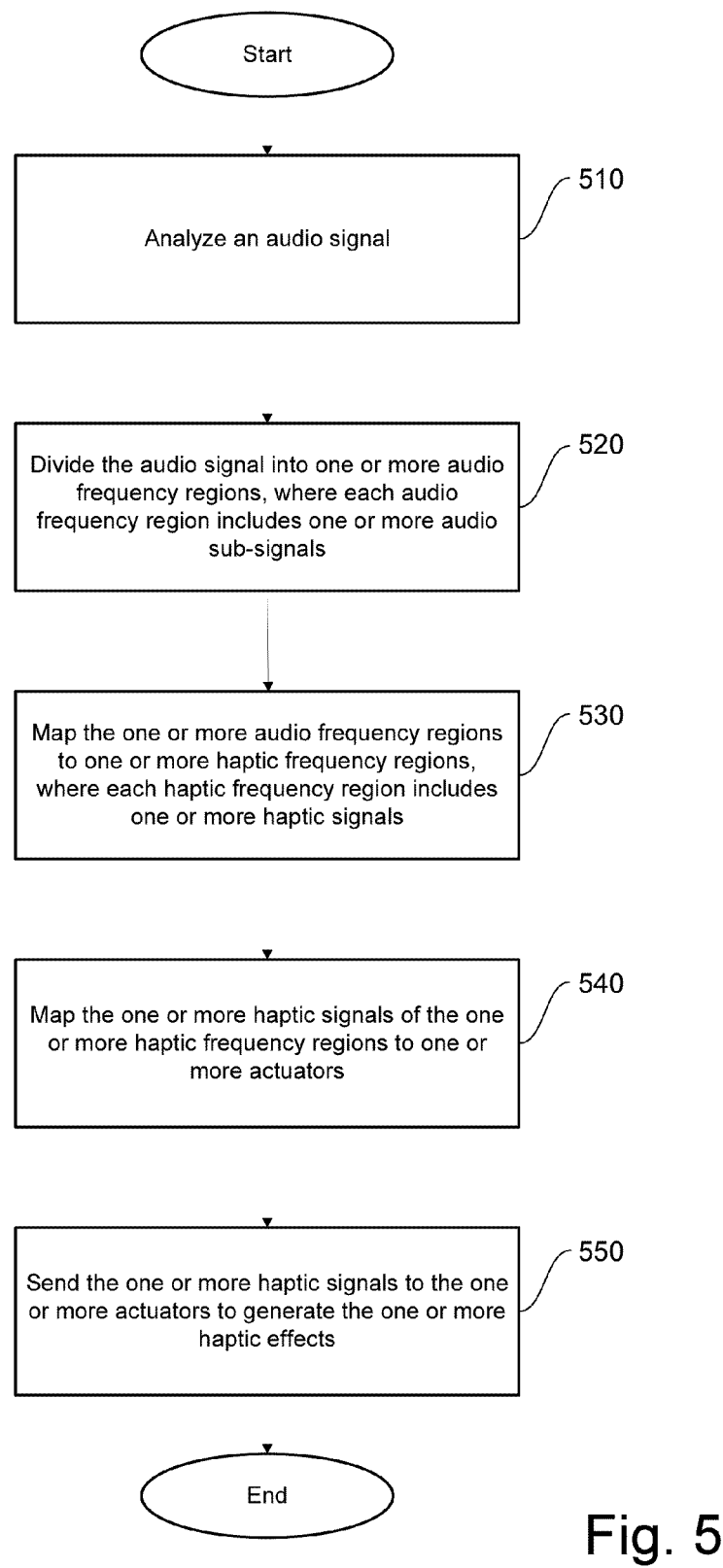
FIG. 5 illustrates a flow diagram of the functionality of a haptic conversion module, according to one embodiment of the invention.

FIG. 5 illustrates a flow diagram of the functionality of a haptic conversion module (such as haptic conversion module 16 of FIG. 1), according to one embodiment of the invention. In one embodiment, the functionality of FIG. 5 is implemented by software stored in memory or another computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. Furthermore, in alternate embodiments, the functionality may be performed by hardware using analog components.

The flow begins and proceeds to 510. At 510, an audio signal is analyzed. In certain embodiments, the audio signal is also pre-processed. Also, in certain embodiments, one or more parameters used to divide the audio signal into one or more audio frequency regions are adjusted. In some of the embodiments, one or more parameters used to pre-process the audio signal are adjusted. The flow proceeds to 520. At 520, the audio signal is divided into one or more audio frequency regions, where each audio frequency region includes one or more audio sub-signals of the audio signal. The flow proceeds to 530. At 530, the one or more audio frequency regions are mapped to one or more haptic frequency regions, where each audio frequency region is mapped to one or more corresponding haptic frequency regions, and where each haptic frequency region includes one or more haptic signals. The flow proceeds to 540. At 540, the one or more haptic signals of the one or more haptic frequency regions are mapped to one or more actuators, where each haptic signal is mapped to one or more corresponding actuators. The one or more actuators can include at least one low frequency actuator and at least one high frequency actuator. The flow proceeds to 550. At 550, the one or more haptic signals are sent to one or more actuators to generate one or more haptic effects, where each haptic signal is sent to its corresponding actuator. The flow then ends. In certain embodiments, such as where the audio signal includes a portion of a song, the flow can be repeated for multiple audio signals, where each audio signal is a separate portion of the song. For example, a two-minute song could be divided into a plurality of audio signals, where each audio signal is a duration of 17 milliseconds ("ms"), and the flow can be repeated for each audio signal of the plurality of audio signals. This is only an example, and the song could be of any duration, and each audio signal of the plurality of audio signals could be of any duration.

Thus, according to an embodiment, a haptic conversion system divides an audio signal into one or more audio frequency regions, maps each audio frequency region to one or more haptic frequency regions, and sends the one or more haptic signals of the one or more haptic frequency regions to one or more actuators to generate one or more haptic effects. The selection of frequencies within the haptic frequency region can cause the haptic conversion system to better utilize the features of the one or more actuators (such as wide bandwidth actuators), and the use of more than one actuator can provide for a richer haptic experience.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to convert an audio signal into one or more haptic effects, the converting comprising:
    pre-processing the audio signal by modifying the audio signal to create a modified audio signal and adjusting one or more parameters used to generate one or more haptic frequency regions based on a measurement of the modified audio signal, wherein the adjusting configures the one or more parameters to enable haptic feedback for foreground events and reduce or mute haptic feedback for background events;
    dividing the modified audio signal into a plurality of audio frequency regions that each comprise one or more audio sub-signals with frequencies within a corresponding audio frequency range;
    generating the one or more haptic frequency regions based on the one or more parameters, wherein each of the one or more haptic frequency regions comprises one or more haptic signals with frequencies within a corresponding haptic frequency region;
    mapping each of the plurality of audio frequency regions to at least one corresponding haptic frequency region in the one or more haptic frequency regions, wherein each audio frequency range is mapped to a plurality of corresponding haptic frequency ranges; and
    sending the one or more haptic signals to an actuator to generate the one or more haptic effects.

2. The non-transitory computer-readable medium of claim 1, the converting further comprising:
    mapping the one or more haptic signals to a plurality of actuators, wherein each haptic signal is mapped to one or more corresponding actuators; and
    sending each haptic signal to its corresponding actuator to generate the one or more haptic effects.

3. The non-transitory computer-readable medium of claim 2, wherein the plurality of actuators comprises a low frequency actuator and a high frequency actuator.

4. The non-transitory computer-readable medium of claim 1, wherein the modified audio signal is divided into the one or more audio frequency regions using one or more filters.

5. The non-transitory computer-readable medium of claim 4, wherein each audio frequency region of the one or more audio frequency regions is produced by a separate filter of the one or more filters.

6. The non-transitory computer-readable medium of claim 1,
wherein a maximum value is calculated for each audio frequency region of the one or more audio frequency regions;
wherein a sine carrier waveform is calculated for each audio frequency region based on the maximum value; and
wherein each haptic frequency region of the one or more haptic frequency regions is generated based on the maximum value and the sine carrier waveform.

7. The non-transitory computer-readable medium of claim 1, wherein a selection of one or more frequencies for each haptic frequency region of the one or more haptic frequency regions is determined based on one or more characteristics of the actuator.

8. The non-transitory computer-readable medium of claim 1, wherein the one or more audio frequency regions comprise:
a first audio frequency region that comprises one or more audio sub-signals with a frequency within a low range;
a second audio frequency region that comprises one or more audio sub-signals with a frequency within a middle range; and
a third audio frequency region that comprises one or more sub-signals with a frequency within a high range.

9. The non-transitory computer-readable medium of claim 8, wherein the one or more haptic frequency regions comprise:
a first haptic frequency region that comprises one or more haptic signals with a frequency within a low range;
a second haptic frequency region that comprises one or more haptic signals with a frequency within a middle range; and
a third haptic frequency region that comprises one or more haptic signals with a frequency within a high range.

10. The non-transitory computer-readable medium of claim 1, wherein the one or more haptic signals are combined into a single combined haptic signal.

11. The non-transitory computer-readable medium of claim 1, the converting further comprising adjusting a plurality of parameters used to divide the modified audio signal into the one or more audio frequency regions.

12. The non-transitory computer-readable medium of claim 1, the converting further comprising adjusting a plurality of parameters used to pre-process the audio signal.

13. The non-transitory computer-readable medium of claim 1, wherein the modifying the audio signal further comprises undersampling the audio signal.

14. The non-transitory computer-readable medium of claim 1, wherein the modifying the audio signal further comprises fusing an average of two or more channels of the audio signal.

15. A computer-implemented method for converting an audio signal into one or more haptic effects, comprising:
pre-processing the audio signal by modifying the audio signal to create a modified audio signal and adjusting one or more parameters used to generate one or more haptic frequency regions based on a measurement of the modified audio signal, wherein the adjusting configures the one or more parameters to enable haptic feedback for foreground events and reduce or mute haptic feedback for background events;
dividing the modified audio signal into a plurality of audio frequency regions that each comprise one or more audio sub-signals with frequencies within a corresponding audio frequency range;
generating the one or more haptic frequency regions based on the one or more parameters, wherein each of the one or more haptic frequency regions comprises one or more haptic signals with frequencies within a corresponding haptic frequency region;
mapping each of the plurality of audio frequency regions to at least one corresponding haptic region in the one or more haptic frequency regions, wherein each audio frequency range is mapped to a plurality of corresponding haptic frequency ranges; and
sending the one or more haptic signals to an actuator to generate the one or more haptic effects.

16. The computer-implemented method of claim 15, further comprising:
mapping the one or more haptic signals to a plurality of actuators, wherein each haptic signal is mapped to one or more corresponding actuators; and
sending each haptic signal to its corresponding actuator to generate the one or more haptic effects.

17. The computer-implemented method of claim 15, wherein the plurality of actuators comprises a low frequency actuator and a high frequency actuator.

18. The computer-implemented method of claim 15, wherein the one or more audio frequency regions comprise:
a first audio frequency region that comprises one or more audio sub-signals with a frequency within a low range;
a second audio frequency region that comprises one or more audio sub-signals with a frequency within a middle range; and
a third audio frequency region that comprises one or more sub-signals with a frequency within a high range.

19. The computer-implemented method of claim 18, wherein the one or more haptic frequency regions comprise:
a first haptic frequency region that comprises one or more haptic signals with a frequency within a low range;
a second haptic frequency region that comprises one or more haptic signals with a frequency within a middle range; and
a third haptic frequency region that comprises one or more haptic signals with a frequency within a high range.

20. A haptic conversion system comprising:
a memory configured to store a haptic conversion module;
a processor configured to execute the haptic conversion module stored on the memory; and
an actuator configured to output one or more haptic effects;
wherein the haptic conversion module is configured to:
pre-process the audio signal by modifying the audio signal to create a modified audio signal and adjusting one or more parameters used to generate one or more haptic frequency regions based on a measurement of the modified audio signal, wherein the adjusting configures the one or more parameters to enable haptic feedback for foreground events and reduce or mute haptic feedback for background events;
divide the modified audio signal into a plurality of audio frequency regions that each comprise one or more audio sub-signals with frequencies within a corresponding audio frequency range;
generate the one or more haptic frequency regions based on the one or more parameters, wherein each of the one or more haptic frequency regions comprises one or more haptic signals with frequencies within a corresponding haptic frequency region;
map each of the plurality of audio frequency regions to at least one corresponding haptic frequency region in the one or more haptic frequency regions, wherein each audio frequency range is mapped to a plurality of corresponding haptic frequency ranges; and send the one or more haptic signals to an actuator to generate the one or more haptic effects.

21. The haptic conversion system of claim 20, further comprising:

a plurality of actuators, each actuator of the plurality of actuators configured to output one or more haptic effects;

wherein the haptic conversion module is further configured to:

map the one or more haptic signals to a plurality of actuators, wherein each haptic signal is mapped to one or more corresponding actuators; and send each haptic signal to its corresponding actuator to generate the one or more haptic effects.

22. The haptic conversion system of claim 21, wherein the plurality of actuators comprises a low frequency actuator and a high frequency actuator.

23. The haptic conversion system of claim 20, wherein the one or more audio frequency regions comprise:

a first audio frequency region that comprises one or more audio sub-signals with a frequency within a low range;

a second audio frequency region that comprises one or more audio sub-signals with a frequency within a middle range; and a third audio frequency region that comprises one or more sub-signals with a frequency within a high range.

24. The haptic conversion system of claim 23, wherein the one or more haptic frequency regions comprise:

a first haptic frequency region that comprises one or more haptic signals with a frequency within a low range;

a second haptic frequency region that comprises one or more haptic signals with a frequency within a middle range; and a third haptic frequency region that comprises one or more haptic signals with a frequency within a high range.

* * * * *